United States Patent [19]

Vrettos

[11] Patent Number: 5,068,942
[45] Date of Patent: Dec. 3, 1991

[54] WINDSHIELD WIPER ASSEMBLY

[76] Inventor: Socrates Vrettos, Arhiginous Saranti 12, 544 53, Thessaloniki, Greece

[21] Appl. No.: 397,263

[22] Filed: Aug. 23, 1989

Related U.S. Application Data

[63] Continuation-in-part of Ser. No. 185,505, Apr. 25, 1988, abandoned.

[51] Int. Cl.⁵ .............................. B60S 1/26; B60S 1/18
[52] U.S. Cl. ............................... 15/250.24; 15/250.29
[58] Field of Search ........... 15/250.24, 250.25, 250.29, 15/250.35

[56] References Cited

U.S. PATENT DOCUMENTS

| | | | |
|---|---|---|---|
| 1,748,055 | 2/1930 | Brown et al. | 15/250.24 |
| 1,865,158 | 6/1932 | Acierno | 15/250.24 |
| 3,042,954 | 7/1962 | Wynn et al. | 15/250.24 |
| 3,399,418 | 9/1968 | Wynn et al. | 15/250.24 |
| 4,306,328 | 12/1981 | Layton | 15/250.24 |

FOREIGN PATENT DOCUMENTS

| | | | |
|---|---|---|---|
| 1455762 | 3/1969 | Fed. Rep. of Germany | 15/250.24 |
| 1067491 | 6/1954 | France | 15/250.24 |
| 1197396 | 6/1959 | France | 15/250.24 |
| 2423382 | 12/1979 | France | 15/250.24 |
| 0061350 | 4/1985 | Japan | 15/250.24 |
| 367752 | 8/1930 | United Kingdom | 15/250.24 |
| 389422 | 3/1933 | United Kingdom | 15/250.24 |
| 86/00052 | 1/1986 | World Int. Prop. O. | 15/250.24 |

Primary Examiner—Harvey C. Hornsby
Assistant Examiner—Gary K. Graham
Attorney, Agent, or Firm—Howard M. Schwinger

[57] ABSTRACT

A windshield wiper assembly consisting of an endless belt positioned beneath a windshield, the belt extending substantially the length of the windshield and supported by a slotted sleeve. A wiper mounting is attached to the belt on its innerside, the belt when fully extended defining an inner space large enough to accommodate the mounting. And a drive for continuously rotating the belt to cause a blade held by the mounting to rapidly move back and forth across the entire windshield.

3 Claims, 2 Drawing Sheets

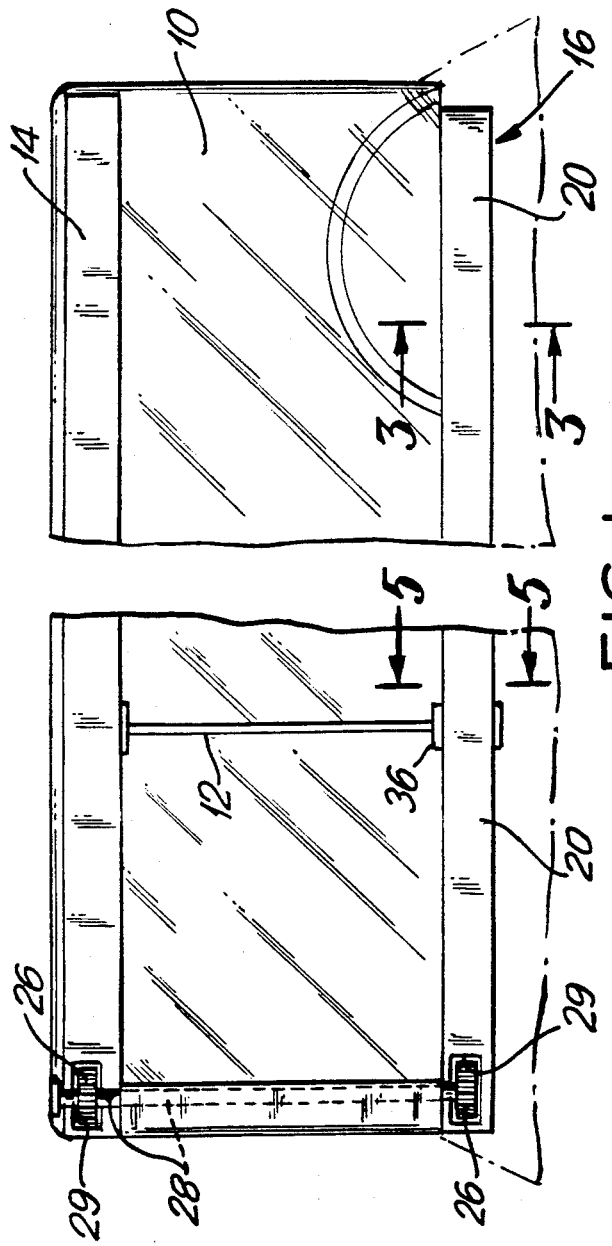
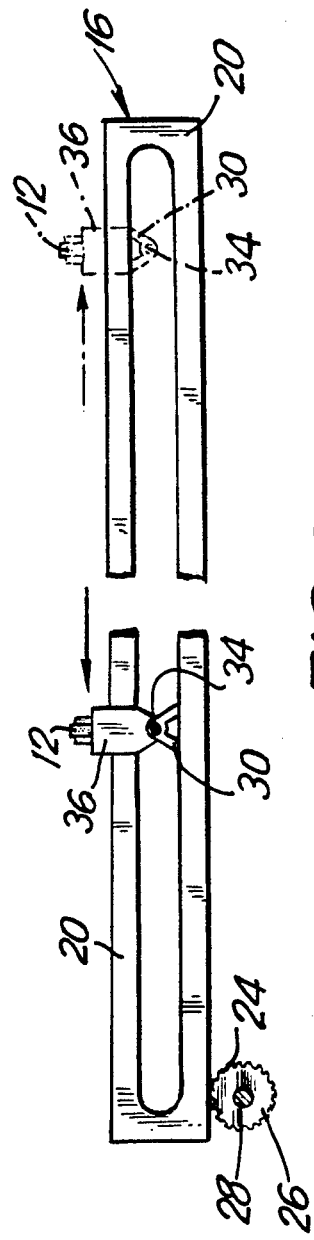

WINDSHIELD WIPER ASSEMBLY

This is a Continuation-in-Part of Ser. No. 07/185,505 filed Apr. 25, 1988 now abandoned.

This invention relates to a windshield wiper assembly.

INTRODUCTION

Conventional windshield wipers fail to do their intended job because they do not move with sufficient speed nor wipe enough of the windshield to make for optimal visibility.

BACKGROUND OF THE INVENTION

It has been thought that such deficiencies could be cured by a wiper assembly consisting of a wiper blade mounted on a belt which is positioned beneath the windshield. The belt is rotatable and the wiper moves with the belt to clean the entire windshield at a high rate of speed. This in contrast to a wiper which is mounted on a fixed point and merely pivots back and forth against a windshield.

STATEMENT OF THE PERTINENT PRIOR ART

Heretofore there have been attempts to reduce this concept to practice but such have not worked out.

Such efforts can be seen by reference to French Patent 1,067,491 issued to Daimler on Jan. 27, 1954 and German Patent 1,455,762 issued to Quanz on Mar. 13, 1969.

Although a belt driven wiper blade is disclosed in these patents, the concept is completely different than what applicant now proposes. For example, Daimler's belt does not rotate. It reciprocates, i.e., it moves back and forth.

Although Quanz's belt rotates, Quanz does not show applicant's method for continuously holding the blade against the windshield regardless of the portion of the belt the wiper is traveling nor does he show applicants manner of driving the belt which enables applicant to obtain high speeds. Additionally, applicant's sleeve arrangement is not to be found in the art.

OBJECTS OF THE INVENTION

It is thus a primary object of the present invention to provide a windshield wiper assembly which permits of high speed operation of the wiper blade.

It is another important object of the present invention to provide a windshield wiper which will clean a large portion of the windshield.

It is yet another object of the present invention to provide a windshield wiper assembly which thoroughly cleans a windshield and does not interfere with visibility

SUMMARY OF THE INVENTION

The objects and advantages of the present invention are realized by a windshield wiper assembly comprising an endless belt adapted to be positioned beneath a windshield, the belt extending substantially the length of the windshield and supported by a slotted sleeve, a wiper mounting attached to the belt on its innerside, said belt being folded upon itself to define an inner space large enough to accommodate said mounting, and a drive positioned exteriorly of the belt and sleeve for continuously rotating the belt to cause a blade held by the mounting to rapidly move back and forth across the entire windshield.

Other objects and advantages of the present invention will become apparent from a reading of the following specification taken in connection with the accompanying drawing wherein:

DESCRIPTION OF THE DRAWING

FIG. 1 is front view of a windshield employing a wiper assembly in accordance with the present invention, FIG. 2 is a top view of the track used in the assembly of FIG. 1.

DETAILED DESCRIPTION

A preferred embodiment of windshield wiper assembly is shown in FIG. 1 mounted, in this particular instance, in proximity to windshield 10. It should be realized that the wiper assembly of the present invention can be used on any windshield, be it intended for use on land, sea or air. The blade 12, in this particular instance, is carried by two sets of tracks, an upper 14 and a lower 16, mounted respectively, above and below windshield 10. The track may be linear or curved depending upon the curvature of the windshield.

Figure 3:
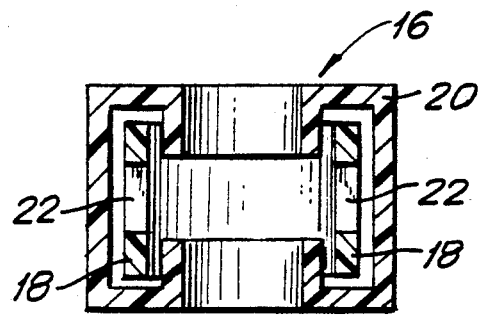
FIG. 3 is a sectional view taken on line 3—3 of FIG. 2, in the direction of the arrows.
Figure 4:
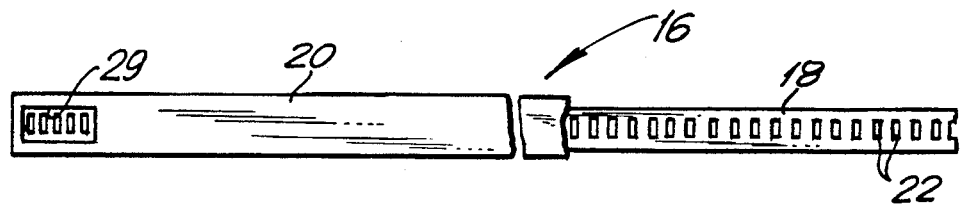
FIG. 4 is a fragmentary view of the sleeve and the belt.

As may be best seen in FIG. 3, each track consists of a belt 18 supported within a slotted sleeve 20. The lower sleeve is supported by shoulders (not shown) which are formed by basic structure. The upper sleeve is mounted where a top wall meets the windshield.

Although an upper and a lower track are shown herein, it is feasible to operate the invention with merely a single track. The track may be of a metal or plastic fabrication. Belt 18 may be of a leather composition. It should be realized that the belt will move at high velocity within its stationary track.

If two tracks are utilized drive shaft 28 may be hidden behind or within post 38. The lower track may readily be concealed, for example, beneath the hood of a car while the upper track may be concealed in an appropriate recess, not shown.

The belt may be slotted, as at 22 to provide grippage for teeth 24 of sprocket 26. If an upper and lower track are utilized, two sprockets will be employed interconnected by drive shaft 28, as shown. An opening 29 is provided in sleeve 20 so that the teeth 24 of sprocket 26 can engage the slots 22 of belt 18 to drive the belt. Shaft 28 may be driven by hydraulic, electrical or any form of motive power if the assembly is used on a vehicle. It is, of course, possible to provide belt 18 with teeth which will mesh with the teeth 24 of sprocket 26 rather than to utilize the slotted arrangement shown herein.

Figure 5:
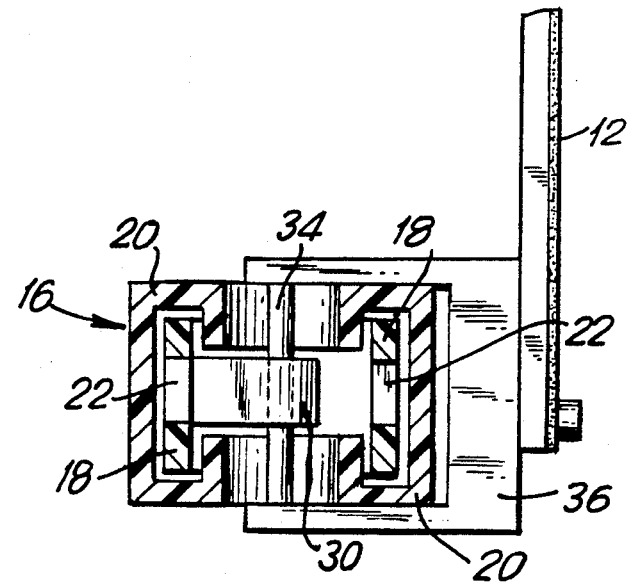
FIG. 5 is a sectional view taken on line 5—5 of FIG. 1, in the direction of the arrows.

As may be seen in FIG. 5, a bracket carrier 30 is affixed to the inside of belt 18, so as to travel with the belt as it rotates within sleeve 20. Bracket carrier 30 has a mounting channel 32 formed therein to receive bracket mounting pin 34. It will be realized that bracket carrier 30 rotates about mounting pin 34 when making the turns as it travels with belt 18. Thus, although the belt 18 is continuously rotating along with bracket carrier 30, bracket 36 which carries blade 12 merely moves back and forth along the inner leg of track 16. Due to its construction, bracket 36 cannot make the turns. Thus, the blade is constantly held against the windshield even when the bracket carrier is traveling on the outside leg of track 16 which is somewhat spaced form the windshield. This action is illustrated in FIG. 2.

In another form of the invention the stem of blade 12 is inserted directly into channel 32 of carrier 30 which rotates about the blade stem as it makes the turn. The blade does not make the turn being held in position by the friction existing between the rubber blade and the glass windshield.

What is important in all instances is that the track be constructed so that the plane of mounting channel 32 remains the same with respect to the windshield regardless of the position of carrier 30, i e, the plane be in the mid-line between the two long legs of the track.

It should be realized that the embodiments herein described are only representative of the invention and it is not intended to limit the invention to these particular embodiments as the invention encompasses all embodiments falling with the spirit and scope of the appended claims.

I claim:

1. A windshield wiper assembly comprising an endless belt adapted to be positioned beneath a windshield, the belt extending substantially the length of the windshield, said belt being movably mounted within and supported by a sleeve conforming in size and shape to the belt, a wiper mounting attached to the innerside of the belt through a slotted opening in the innerside of said sleeve, said sleeve innerside defining a space large enough to accommodate said mounting, said mounting extending into said space and being rotatable about a wiper blade to be supported by it, and a drive for continuously rotating the belt only in one direction to cause a wiper blade held by the mounting to rapidly move back and forth across the entire windshield, said drive comprising a sprocket positioned exteriorly of the belt and sleeve, said belt being slotted for engaging the sprocket through an opening in the outerside of said sleeve.

2. An assembly in accordance with claim 1 wherein the wiper is held at its upper end in an assembly positioned above the windshield, said upper assembly being analogous in structure and size to the assembly positioned below the windshield.

3. An assembly in accordance with claim 2 wherein the drive sprockets of said upper and lower assemblies are interconnected and receive power from the same source.

* * * * *